US007286503B1

(12) United States Patent
Clarke et al.

(10) Patent No.: US 7,286,503 B1
(45) Date of Patent: Oct. 23, 2007

(54) SYSTEM AND APPARATUS FOR AVOIDING INTERFERENCE BETWEEN FIXED AND MOVEABLE BASE TRANSCEIVER STATION

(75) Inventors: Matthew Alexander Clarke, Northants (GB); Duncan Paul Balmbra, Reading (GB)

(73) Assignee: Stratos Global Limited, London (GB)

( * ) Notice: Subject to any disclaimer, the term of this patent is extended or adjusted under 35 U.S.C. 154(b) by 859 days.

(21) Appl. No.: 10/069,223

(22) PCT Filed: Aug. 10, 2000

(86) PCT No.: PCT/GB00/03087

§ 371 (c)(1), (2), (4) Date: Nov. 22, 2002

(87) PCT Pub. No.: WO01/15338

PCT Pub. Date: Mar. 1, 2001

(30) Foreign Application Priority Data

Aug. 25, 1999 (GB) ............................. 993067633.6
Apr. 14, 2000 (GB) ............................. 00303164.8

(51) Int. Cl.
*H04Q 7/00* (2006.01)
(52) U.S. Cl. .................................... 370/328; 455/422.1
(58) Field of Classification Search ............ 455/422.1, 455/414.1; 370/386; 342/257.1
See application file for complete search history.

(56) References Cited

U.S. PATENT DOCUMENTS

| 4,774,514 A | | 9/1988 | Hildebrandt et al. |
| 5,073,972 A | * | 12/1991 | Tendler et al. ............... 340/7.5 |
| 5,210,786 A | * | 5/1993 | Itoh ........................ 455/445 |
| 5,438,610 A | | 8/1995 | Bhagat et al. |
| 5,444,762 A | * | 8/1995 | Frey et al. .................. 455/431 |
| 5,490,284 A | | 2/1996 | Itoh et al. |
| 5,519,761 A | | 5/1996 | Gilhousen |

(Continued)

FOREIGN PATENT DOCUMENTS

EP 0 838 909 4/1989

(Continued)

OTHER PUBLICATIONS

Suzuki et al., "Call Routing and Data Model for Inter-Network Roaming in PCS", IEICE Trans. Commun., vol. E79 B. No. 9, Sep. 1996, pp. 1371-1379.

(Continued)

*Primary Examiner*—Ajit Patel
(74) *Attorney, Agent, or Firm*—Steptoe & Johnson LLP (57) ABSTRACT

Apparatus for providing telephone connection between one or more cellular radio telephones and a cellular radio switching system, comprises at least one moveable base transceiver station (511) for providing a radio connection with the cellular radio telephones, and having means for detecting whether the moveable base transceiver stations are in range of a fixed base transceiver station (543), and means for controlling the output of the moveable base transceiver stations (511) when such a fixed base transceiver station is detected such that transmissions from the moveable base stations do not interfere with transmissions from the fixed base station within a predetermined area surrounding the fixed base station (543). The system may also include a position finding system (590, 591), linked to the output control such that transmissions from the transmitter (511) cannot be detected within a predetermined area (T).

13 Claims, 5 Drawing Sheets

U.S. PATENT DOCUMENTS

| | | | |
|---|---|---|---|
| 5,557,656 A * | 9/1996 | Ray et al. | 455/431 |
| 5,577,264 A | 11/1996 | Tuohino | |
| 5,832,380 A * | 11/1998 | Ray et al. | 455/431 |
| 5,842,132 A * | 11/1998 | Fukutomi | 455/456.1 |
| 5,887,258 A | 3/1999 | Lemozit et al. | |
| 5,946,618 A * | 8/1999 | Agre et al. | 455/428 |
| 5,950,129 A | 9/1999 | Schmid et al. | |
| 5,963,877 A | 10/1999 | Kobayashi | |
| 5,995,833 A * | 11/1999 | Zicker | 455/430 |
| 6,002,944 A | 12/1999 | Beyda | |
| 6,032,041 A * | 2/2000 | Wainfan et al. | 455/427 |
| RE36,712 E * | 5/2000 | Sato et al. | 455/574 |
| 6,108,539 A * | 8/2000 | Ray et al. | 455/430 |
| 6,128,468 A | 10/2000 | Wyrwas | 455/12.1 |
| 6,269,243 B1 | 7/2001 | Corbefin et al. | |
| 6,741,841 B1 * | 5/2004 | Mitchell | 455/188.1 |
| 6,834,188 B1 * | 12/2004 | Menon | 455/427 |
| 2002/0045444 A1 * | 4/2002 | Usher et al. | 455/422 |
| 2002/0142717 A1 * | 10/2002 | Morimoto | 455/11.1 |

FOREIGN PATENT DOCUMENTS

| | | |
|---|---|---|
| EP | 0 862 283 | 9/1998 |
| EP | 0 915 577 | 5/1999 |
| EP | 0 920 147 | 6/1999 |
| EP | 0 923 257 | 6/1999 |
| EP | 0 932 266 | 7/1999 |
| EP | 0 936 829 | 8/1999 |
| FR | 2773931 | 7/1999 |
| GB | 2169175 | 7/1986 |
| GB | 2282299 | 3/1995 |
| GB | 2310973 | 9/1997 |
| GB | 2320992 | 7/1998 |
| GB | 2324395 | 10/1998 |
| WO | WO94/28684 | 12/1994 |
| WO | WO9428684 A1 * | 12/1994 |
| WO | WO97/36442 | 10/1997 |
| WO | WO97/37500 | 10/1997 |
| WO | WO98/21838 | 5/1998 |
| WO | WO98/26521 | 6/1998 |
| WO | WO99/12227 | 3/1999 |
| WO | WO99/62274 | 12/1999 |
| WO | WO 99/62274 | 12/1999 |
| WO | WO 01/15337 | 3/2001 |

OTHER PUBLICATIONS

Uchiyama et al., "Network Functions and Signaling for Personal Roaming between Digital Cellular Standards", IEEE International Conference on Universal Personal Communications, New York, IEEE, vol. Conf. 4, Nov. 1995, pp. 447-451.

Nodera et al., "Interworking between GSM and PDC through IC Cards", Proceedings of the Conference on Communications (ICC), New York, IEEE, Jun. 1995, pp. 761-765.

GSM World Press Release, "GSM Association Agreement with SkyPhone to use TAP for Billing makes Calling from Aircraft Simple", http://www.gsm.org/news/press_releases_04.html, Aug. 1999.

Fernandez et al., "Le TFTS Alcatel 9810: un systemme europeen de communications air-sol", Commutation et Transmission, vol. 13, No. 4, Sotelec, Paris, France, 1991, pp. 5-16.

BTtoday NEWSDESK website, "Lift off for BT in-flight GSM service", http://today.intra.bt.com/art6594.html, Jul. 2000.

Beresford, "Office in the sky is now ready for take off", BT today, Jan. 2000, p. 4.

International Search Report for PCT/IB01/00830.
International Search Report for PCT/GB00/03074.
International Search Report for PCT/GB00/03087.
International Search Report for PCT/IB01/00811.
International Search Report for PCT/GB00/03088.
International Search Report for PCT/IB01/00802.

* cited by examiner

SYSTEM AND APPARATUS FOR AVOIDING INTERFERENCE BETWEEN FIXED AND MOVEABLE BASE TRANSCEIVER STATION

This invention relates to mobile telephony, and in particular to systems for use on board vehicles.

There has been considerable activity in recent years in proposals to allow the use of mobile telephones in environments where conventional cellular telephony base stations cannot provide coverage, in particular on board ships and aircraft. These vehicles frequently travel beyond the range of land-based cellular base stations, which typically have a range of the order of 1 to 10 km.

For truly global coverage, satellite telephones are available. However, these are expensive and much heavier than a cellular telephone.

A user without his own satellite telephone may use special facilities provided on board, such as the service provided to several airlines by the applicant company under the Registered Trade Mark "Skyphone". This uses onboard terminals connected, through a satellite link between the aircraft and a satellite ground station, to the telephone network. Another system, TFTS (terrestrial flight telephony system, marketed as "Jetphone"), operates in a similar manner, but uses a direct link between the aircraft and the ground station, without a satellite link. Similar systems are provided on board ships. However payment for these services is generally at the point of use (or prepaid), and may be in a foreign currency. Calls made to the user's cellular telephone will not be successful unless the calls can be diverted to the telephone number of the onboard user terminal (which will generally not be known to the caller), and any special facilities offered by the user's cellular network will in general be unavailable. A user with his own cellular telephone account which, through "roaming" agreements between network operators, can be used in many different countries, would therefore prefer to continue to use his cellular telephone subscription when travelling within or between these countries on board an aircraft or other vehicle.

Proposals have also been made to allow a user to use his own cellular radio identity when using the satellite facility, instead of a special identity under the satellite system. This would allow billing to be made through the user's normal cellular radio account, and would also allow incoming calls made to his cellular telephone number to be received whilst travelling. To this end, systems have been developed which allow call diversions to be set up to allow calls made to the user's cellular number to be transferred to a destination node of the tracking radio system. The destination node may be an onboard handset temporarily allocated the user's cellular identity, or it may be an onboard base station capable of wireless connection to the user's own cellular telephone. Systems of this general kind have been disclosed in International Patent Applications WO99/12227 (Nokia), WO94/28684 (Nordictel) and WO98/26521 (Ericsson); European Patent Applications 0920147 (Alcatel) and 0915577 (Rohde & Schwartz), and United Kingdom Patent Application 2310973 (Motorola). An onboard base station can be integrated with other onboard systems, allowing local control of the base station's transmitter, and those of the mobile units with which it is co-operating, so as to keep their power within permitted limits.

There are a number of circumstances in which a cellular telephone system on board a ship could interfere with ordinary cellular base stations nearby. For example, when a ship is close to shore, the onboard cellular base station may be detectable on shore, and interfere with onshore stations. Within territorial waters use of the system may also breach regulatory conditions.

According to the invention, there is provided apparatus for providing telephone connection between one or more cellular radio telephones and a cellular radio switching system, comprising at least one moveable base transceiver station for providing a radio connection with the cellular radio telephones, and having means for detecting whether the moveable base transceiver station is in range of a fixed base transceiver station, and means for controlling the output of the moveable base transceiver station when such a fixed base transceiver station is detected such that transmissions from the moveable base station do not interfere with transmissions from the fixed base station within a predetermined area surrounding the fixed base station.

According to another aspect, there is provided a method for providing telephone connection between one or more cellular radio telephones and a cellular radio switching system, comprising one or more moveable base transceiver stations, wherein the operation of the moveable base transceiver stations is controlled when a fixed base transceiver station is detected such that transmissions from the moveable base stations do not interfere with transmissions from the fixed base station within a predetermined area surrounding the fixed base station.

The output may be controlled by limiting the permitted time delay between the moveable base transceiver station and any co-operating mobile units, or by disabling some or all of the moveable base transceiver stations. In addition, the output may be controlled by detecting the geographical location of the moveable base transceiver stations, and controlling their output according to their position, using predetermined positional conditions.

Embodiments of the invention will now be described with reference to the Figures, in which.

The following embodiments illustrate the invention using a standard switched cellular network. However, the invention is applicable to other cellular networks, such as packet networks used to carry data over a distributed computer network such as the "Internet", carrying messages using formats such as the "Internet Protocol" (IP). Thus, unless the context clearly demands otherwise, any reference in this specification to switching includes the equivalent routing functions in a packet network of this kind.

Figure 1:
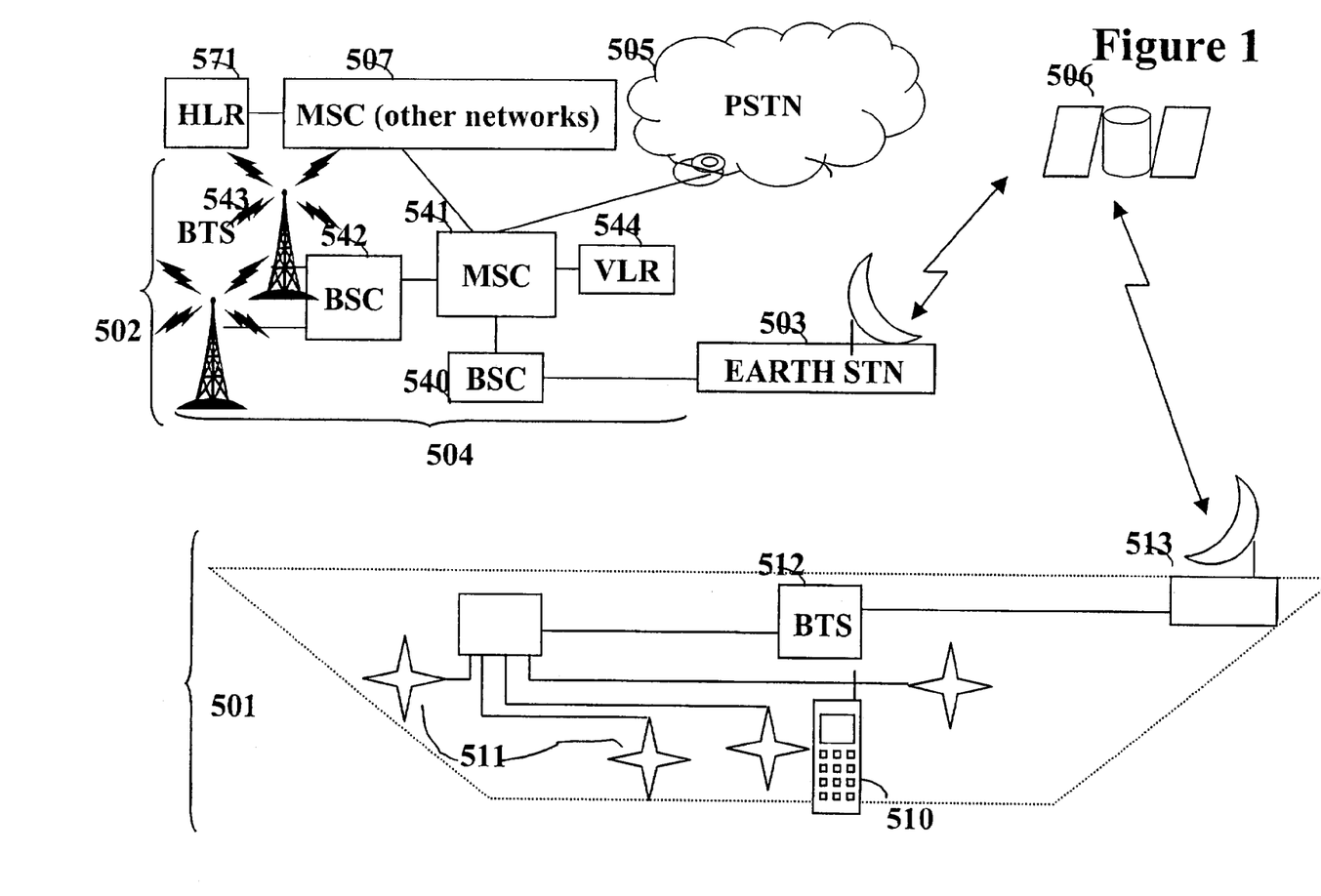
FIGS. 1, 2 and 3 illustrate three embodiments of the invention.

Three embodiments of the invention will now be described, by way of example, with reference to FIGS. 1 to 3 of the drawings respectively. These embodiments are all based on the system architecture of the GSM (Global System for Mobile radio) standard, and are intended for use on board a ship. These embodiments differ in the location of the various components of the GSM system architecture, and the position of the satellite link in that architecture.

In all three embodiments, the system can be categorised into two main components: namely the shipboard part 501 and the fixed part 502, communicating with each other through a satellite connection 506. The fixed part 502 is itself in two parts, namely a satellite earth station 503 and a public land mobile network (PLMN) 504, which is in turn interconnected with other mobile networks 507 and fixed networks 505 to allow calls to be made between users of different networks.

The system provides a cellular radio subscriber with the ability to use his own handset 510 aboard a ship, located anywhere within an agreed satellite coverage area. The coverage aboard ship can be provided by any suitable means, using known radio repeater distribution systems 511 to provide radio coverage wherever required. The arrangement of FIG. 1 will be described first.

The distribution system 511 is fed by a base transceiver site 512, for onward transmission to the satellite earth station 503 via a satellite tracking system 513. The satellite tracking system may be a conventional satellite telephone system as commonly used for ship-to-shore communications, providing a satellite link 506 from the ship's satellite tracking system 513 to the satellite earth station 503. In the embodiment of FIG. 1, the satellite earth station 503 is in turn connected to a Base Site Controller (BSC) 540 associated with the mobile switching centre (MSC) 541 of a conventional cellular telephone system. The satellite connection provides several voice channels and a signalling channel {supervisory control—management channel}, and can be made by any connection of appropriate capacity.

In the cellular mobile network 504, standard GSM functionality is used. Both the base transceiver site 512 and the shore-based base site controller 540 are largely conventional, but have an extra software upload facility to allow for the delays incurred over the satellite link 503-506-513. In particular the "A-bis" link between a BTS and a BSC normally has an allowable time delay of 40 ms. Longer delays are identified as being indicative of a fault and cause the link to be shut down. In this embodiment the allowable delay is expanded to approximately 700 ms to allow for delays in the satellite link 503, 506, 513. The base site controller 540 operates in conventional manner, being connected to the mobile switching centre 541 of the host network 504. The host network 504 may also support one or more further base site controllers 542 controlling conventional base transceiver sites 543. The Mobile Switching Centre 541 also has an associated "Visitor Location Register" 544 which, in conventional manner, records details of the cellular telephones currently co-operating with the Mobile Switching Centre 541, so that details can be exchanged with the Home Location Register 571 of the user's home network for billing purposes, and to allow incoming calls to the handset 510 to be routed correctly. These details include the identity of the BSC 540, 542 to which the user is connected, allowing different call charges to be applied for use in different cells, and in particular for calls made through the onboard base transceiver site 512.

Users aboard the ship will be able to use this service provided they are subscribers to the host network 504, or if they subscribe to a network 507 which has a "roaming" agreement with the host network 504, and the subscriber has global roaming authorised by his service provider. "Roaming" is the arrangement which allows a subscriber to one network to use his cellular telephone when connected to another network.

In use, both parties to a call, and the cellular network 504, operate normally. The cellular telephone 510 co-operates with the base station 512 on the ship as it would with any other base station 543. The home location register 571 identifies the cellular telephone 510 as currently served by the MSC 541, and routes incoming calls accordingly.

Figure 2:
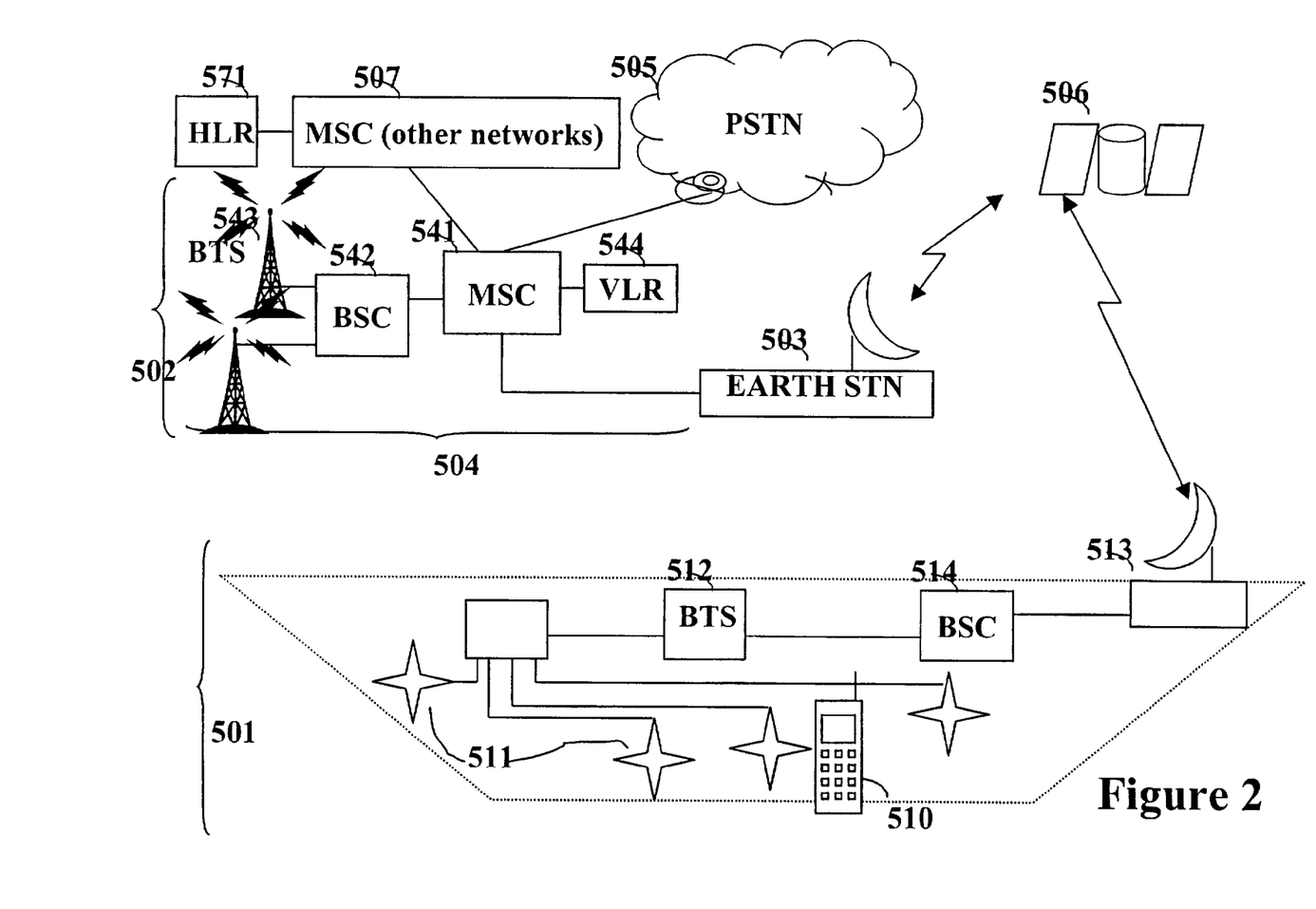

In second embodiment, shown in FIG. 2, the Base Site Controller 514 is on the ship, and the satellite link 503-506-513 is between the MSC 541 and the BSC 514. This reduces the signalling overhead over the satellite link 503-506-513 as there is much less traffic between an MSC and a BSC than there is between a BSC and a BTS, so the cost of the satellite link can be reduced—perhaps to the extent that an on-demand satellite link may be preferable to a permanently leased one. Despite its onboard physical location, the BSC 514 is still perceived by the network 504 as part of the region served by the MSC 541.

Figure 3:
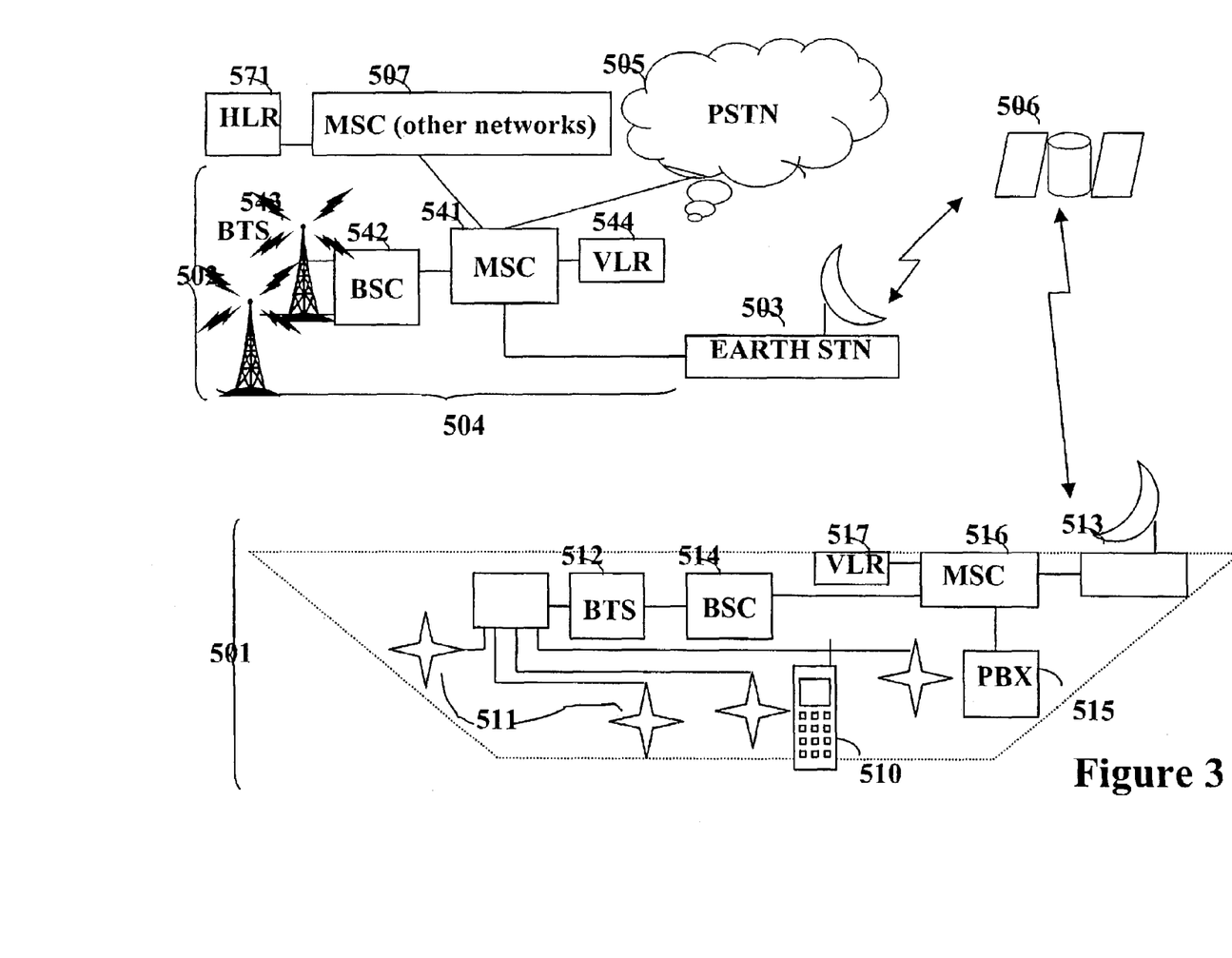

In the third embodiment, shown in FIG. 3, a subsidiary mobile switching centre 516 is provided on board the ship, with its own visitor location register 517. The satellite link 503-506-513 is now between the shore based MSC 541 and the onboard MSC 516. The user record in the HLR 571 will identify the mobile unit 510 as currently served by the onboard MSC 516, and route incoming calls (by way of the shore based MSC 541) accordingly. Alternatively, the HLR 571 may merely identify the mobile unit 510 as served by the network 504, and route the call to the MSC 541, which will in turn recognise from its entry in the shore based VLR 544 that this mobile unit is currently being served by the subsidiary MSC 516.

This embodiment allows integration of the onboard MSC 516 with the ship's internal telephone exchange (PBX) 515. In particular it provides a simple means of providing passengers and crew with a "Wireless PBX" facility, as users on board the ship can communicate with each other through the BSC 514 without using the satellite link 503-506-513. When a call is made by a cellular telephone 510, the serving MSC 516 first consults its VLR 517 to establish whether the called party is currently served by the same MSC 516. If this is the case, it connects the call without the use of any inter-MSC links. Thus, in this third embodiment, calls made between two users both on board the ship 501 may be made without the use of the satellite link 503-506-513.

If the ship 501 moves into radio range of land-based base transceiver sites 543, signals from the land-based sites may interfere with the onboard transceivers 511, and vice versa. It is known for conventional land-based systems to experience similar problems from time to time as a result of variations in atmospheric conditions, or other factors affecting radio propagation such as temporary structures in the line of sight, or even whether trees are in leaf. Such land based systems can be arranged to select alternative frequencies or reduce signal strength if such interference is detected. However, the situation with a mobile base station 511 is more complex, and changes more often. In particular, the operator of the mobile base station 511 will not, in general, have a license to operate within the territory covered by the fixed base stations 543, and may only be permitted to operate in, and be detectable in, international waters. This means that the system should be shut down when in territorial waters, so that users on bpoard can operate with the local land-based system 543. Moreover, the power should be controlled so that if the mobile base stations are close to the boundary of territorial waters, other mobile users within territorial waters will nevertheless connect to a land-based station.

Figure 4:
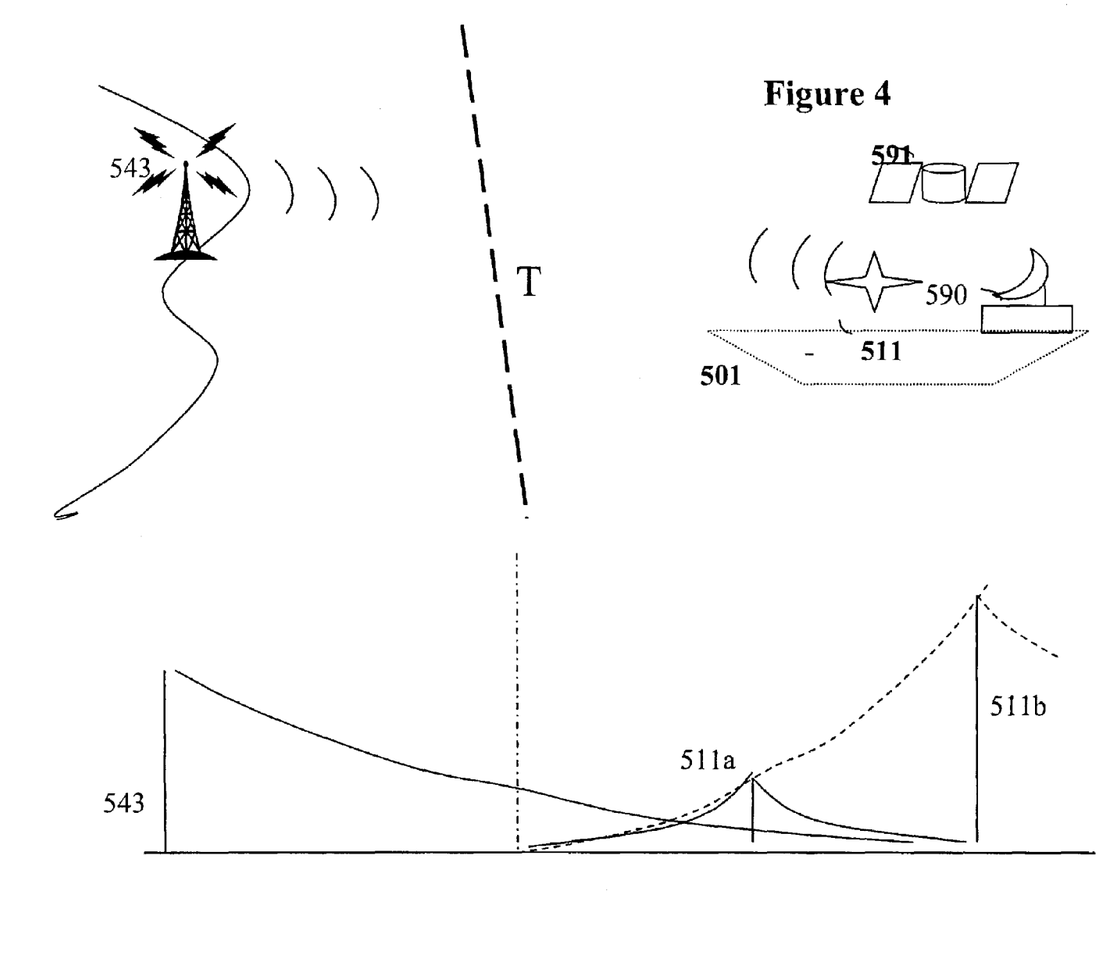
FIG. 4 illustrates the power control process of the invention.

FIG. 4 illustrates a typical situation. The system will be assumed to operate according to the general arrangement of FIG. 2: that is the satellite link 503, 506, 513 is between the base site controller 514 and the mobile switching centre 541.

The ship 501 is outside territorial waters (boundary T) and there is a terrestrial base station 543 on the shore. The lower part of the diagram illustrates how the power output of an above-deck base station 511 is controlled at two locations 511a, (power received represented by full line) and 511b (power in dotted line) such that, in both cases, within the boundary T the received power is so low that a cellular telephone will not be able to register with it. The position of the boundary T relative to the ship 501 can be determined using any known navigation system such as the satellite-based "Global Positioning System", using a GPS satellite 591 and receiver 590, linked to a database determining where such boundaries T are located.

To avoid interference with other radio systems outside territorial waters, and to prevent users in nearby vessels using the onboard system 511 in preference to the land-based system 543, the onboard system 501 may have means for detecting usable signals from a land-based transmitter 543 and switching off the onboard transmitters 511 when such signals are detected. This will allow users to connect to the onshore system 543. Transmitters serving areas below decks, where the onshore transmitter 543 cannot be detected, may remain switched on outside territorial waters.

Instead of power control, the system may be arranged to limit the time delay permitted on a base station to mobile station link. The time delay is usually limited to the length of one time slot in a time division system, usually 0.2 ms, a round trip time equivalent to a distance of about 30 km (sometimes extended to 0.4 ms (60 km) over the sea to allow extended range, by allocating two timeslots per user). By limiting the permitted time delay to a few microseconds the effective range of the base station can be limited to the immediate vicinity of the ship, preventing mobile units on nearby vessels using the onboard system instead of the terrestrial one. In this way the system can be confined to users onboard the ship 501.

The shipboard system 501 is arranged to shut down, for example by discontinuing the satellite link 503-506-513, by switching off the onboard distribution network 511, or by other means, when operating in regions where operation of the system is not permitted, for example within territorial waters. Users of mobile telephones 510 on board the ship may then connect to the shore-based BTS 543. If the local network is not the network 504 to which the onboard BTS 512 is connected, users will "roam" from the host network 504 to the local network in conventional manner when such a transfer takes place. However, until the user does make such a transfer, the user's home network 507 will continue to operate as if the user is connected to the host network.

Figure 5:
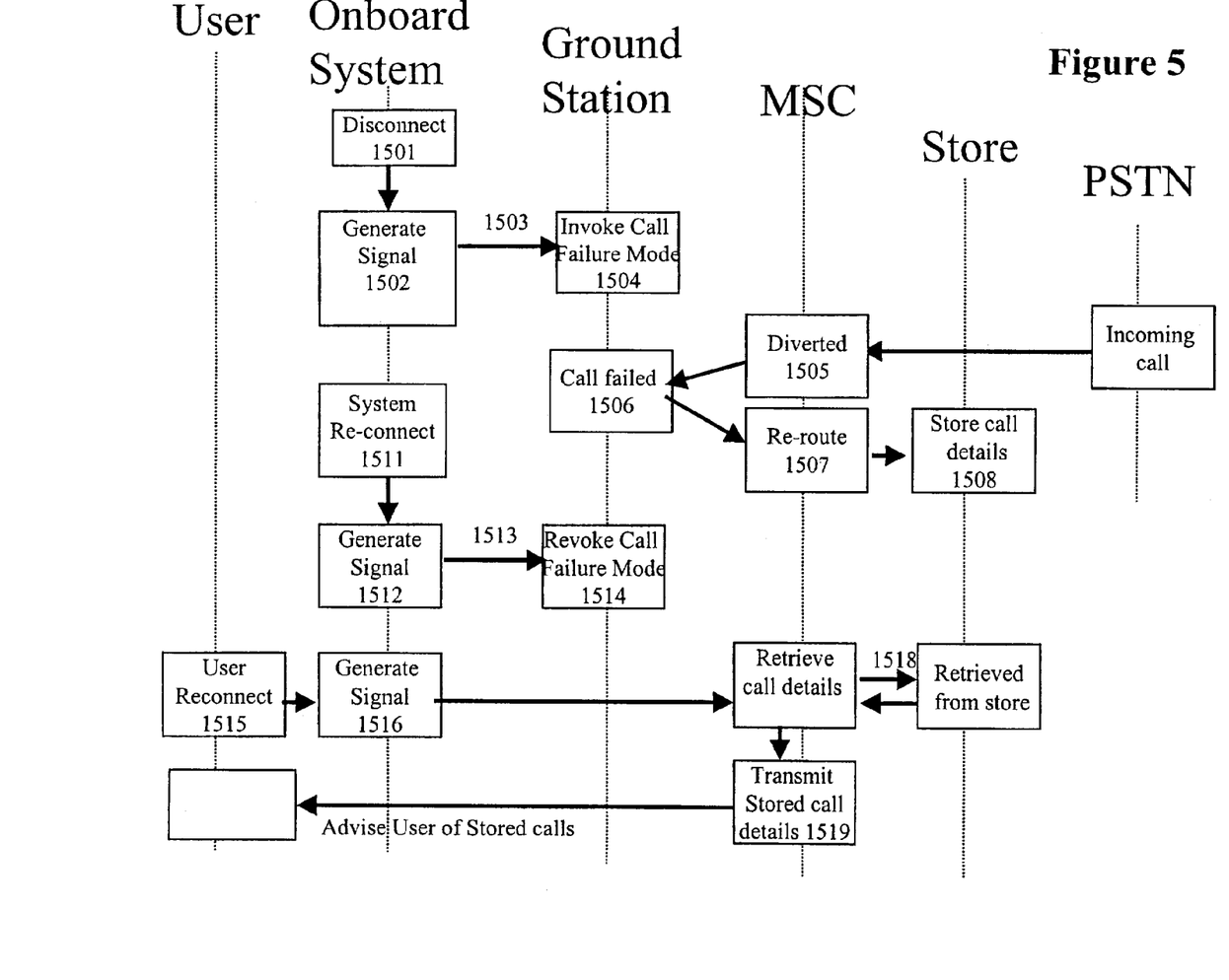
FIG. 5 is a flow chart showing a call diversion process, for use when the system has to be temporarily shut down.

FIG. 5 shows a process for intercepting calls when the onboard system 501 is switched off at times when its operation could interfere with conventional land-based cellular systems or with electronic control systems of the vehicle, to enforce "quiet" periods on board, or to allow transfer of the satellite link from one satellite to another. The control to switch the system off may be performed manually or under the control of a sensor detecting interference from nearby radio base stations 543, or an operational condition of the vehicle. When such a disconnection occurs (step 1501), a signal is generated in the onboard system 501 (step 1502) for transmission over the satellite link 506 to the ground station 503 (step 1503). This signal causes the satellite ground station to invoke a call failure mode for any call directed to the onboard system 501 of the specified vehicle (step 1504).

Any call now diverted by the MSC 541 to a number corresponding to a node on board the vehicle (step 1505) will then receive a "call failed" indication from the ground station (step 1506), without any signalling required over the satellite link 506. Such failed calls will be re-routed according to the user's own diversion instructions, stored by the host MSC 541 for use when the user's handset is busy (step 1507). Generally, such instructions will be to divert the call to a voicemail system in the user's home network. In addition, the host MSC 541 will record the existence, and possibly the origin {Calling line identity—CLI} of any such call attempts (step 1508).

When the onboard system 501 is re-activated (step 1511) a further signal is transmitted by the onboard system (step 1512) for transmission over the satellite link 506 to the ground station 503 (step 1513). This signal causes the satellite ground station to revoke the call failure mode for calls directed to the onboard system 501 of the specified vehicle (step 1514). When a user terminal 510 reconnects to the onboard system 501 (step 1515) the onboard system transmits a signal to the host MSC 541 (step 1516) which causes the host MSC 541 to retrieve the call attempt record previously stored for that user (step 1518). If one or more such call attempts have been made, the MSC returns a message to the user terminal 510 (step 1519), prompting the user to retrieve his messages from the voicemail system should he so wish.

The invention claimed is:

1. A method for providing cellular service aboard a ship, comprising:
   providing first and second cellular coverage zones, the first zone being substantially confined to an interior of the ship and the second zone providing an effective range of coverage above-deck or outside the ship;
   reducing, in response to interference above a desired level between the second zone and a land-based cellular node, the effective range of coverage of the second zone;
   wherein said reducing does not change the area covered by the first cellular coverage zone.

2. The method of claim 1, wherein said reducing the effective range of coverage lowers the interference to below the desired level.

3. The method of claim 2, further comprising:
   suspending the provision of cellular service in the second zone in response to the interference exceeding the desired level regardless of said reducing; and
   continuing cellular service in the first zone during said suspending.

4. A method of providing ship-based cellular service aboard a ship as the ship approaches another cellular network, the method comprising:
   providing, when the ship is outside of a first predetermined distance from the another cellular network, a first effective range for the ship-based cellular coverage;
   maintaining, when the ship is outside of a second distance from the another cellular network but within the first distance, the ship-based cellular service at a second effective range, which is smaller than the first effective range; and
   suspending said ship-based cellular service when the ship is within the second distance.

5. The method of claim 4, wherein the first effective range is substantially fixed.

6. The method of claim 4, wherein the second effective range is variable.

7. The method of claim 4, wherein the first distance is a minimum distance at which the first effective range of the ship-based cellular service will not provide cellular service to users within the another cellular network.

8. The method of claim 4, wherein the second distance is a minimum distance at which the second effective range of the ship-based cellular service will not overlap with a predetermined area around the another cellular network.

9. The method of claim 4, wherein the first distance is a minimum distance at which the first effective range of the ship-based cellular service will not extend into the area determined by the second distance.

10. The method of claim 4, wherein the second distance is based on an outer boundary set by a controlling legal authority within which said ship is not permitted to provide cellular service.

11. The method of claim 4, wherein the ship-based cellular coverage is a first ship-based cellular coverage that extends above deck and outside the ship, the method further comprising:

providing a second ship-based cellular coverage that extends below deck independent of said providing the first ship-based cellular coverage;

wherein said providing a second first ship-based cellular coverage is not interrupted by said maintaining or said suspending.

12. A ship, comprising:

first and second sections of said ship, said first section including the external portions of the ship and said second section including at least below decks areas of said ship;

first and second cellular networks dedicated to said first and second sections, respectively;

means for controlling an effective range of the first cellular network to prevent the first cellular network from providing cellular service to cellular devices outside the legal jurisdiction of the ship;

wherein an effective range of the second cellular network does not change in association with a change in the effective range of the first cellular network.

13. The ship of claim 12, wherein said means for controlling will set the effective range of the first cellular network to:

a predetermined level when the effective range does not overlap with the coverage of another cellular network;

a reduced level when the predetermined level would overlap with the coverage of another cellular network; and zero when overlap cannot be avoided regardless of how small the reduced level is.

* * * * *